US009510389B2

(12) United States Patent
Wang et al.

(10) Patent No.: US 9,510,389 B2
(45) Date of Patent: Nov. 29, 2016

(54) DISCONTINUOUS RECEPTION CONFIGURATION

(71) Applicant: BLACKBERRY LIMITED, Waterloo (CA)

(72) Inventors: Yiping Wang, Allen, TX (US); Takashi Suzuki, Ichikawa (JP); Andrew Mark Earnshaw, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 81 days.

(21) Appl. No.: 14/037,868

(22) Filed: Sep. 26, 2013

(65) Prior Publication Data

US 2015/0085712 A1    Mar. 26, 2015

(51) Int. Cl.
*H04W 76/04* (2009.01)
*H04L 5/14* (2006.01)
*H04L 1/00* (2006.01)
*H04W 52/02* (2009.01)
*H04W 28/18* (2009.01)
*H04L 5/00* (2006.01)

(52) U.S. Cl.
CPC ............. *H04W 76/048* (2013.01); *H04L 1/00* (2013.01); *H04L 5/1469* (2013.01); *H04W 52/0216* (2013.01); *H04W 52/0235* (2013.01); *H04L 5/0092* (2013.01); *H04W 28/18* (2013.01)

(58) Field of Classification Search
CPC ......... H04W 76/048; H04W 52/0235; H04W 52/0216; H04W 72/04; H04W 28/18; H04L 5/14; H04L 5/00; H04L 5/1469; H04L 1/00; H04L 5/0092
See application file for complete search history.

(56) References Cited

U.S. PATENT DOCUMENTS

| 9,084,275 B2 | 7/2015 | Wang |
| 2009/0207794 A1 | 8/2009 | Meylan |
| 2011/0205928 A1* | 8/2011 | Pelletier et al. ............... 370/252 |
| 2014/0064233 A1* | 3/2014 | Oizumi ................. H04L 1/1854 370/329 |
| 2014/0293883 A1 | 10/2014 | Wang |

FOREIGN PATENT DOCUMENTS

| EP | 2521415 A1 | 11/2012 |
| WO | 2014066510 A1 | 5/2014 |

(Continued)

OTHER PUBLICATIONS

European Patent Office, PCT Notification of Transmittal of the International Search Report and the Written Opinion of the International Searching Authority, or the Declaration for International Appl. No. PCT/US2014/057396, dated Mar. 26, 2015 (11 pages).

(Continued)

*Primary Examiner* — Kwang B Yao
*Assistant Examiner* — Moo Ryong Jeong
(74) *Attorney, Agent, or Firm* — Trop Pruner & Hu, P.C.

(57) ABSTRACT

A configuration of a discontinuous reception (DRX) operation is provided at a user equipment (UE) to handle dynamic uplink-downlink configuration changes. In some examples, providing the configuration of the DRX operation comprises providing a mapping between uplink-downlink configurations and respective plural sets of DRX parameters, where each set of DRX parameters of the plural sets of DRX parameters includes a value of an onDurationTimer parameter and a value of a drx-InactivityTimer parameter.

12 Claims, 8 Drawing Sheets

(56) References Cited

FOREIGN PATENT DOCUMENTS

WO  2014117323 A1  8/2014
WO  2015017978 A1  2/2015

OTHER PUBLICATIONS

3GPP TSG RAN WG1 Meeting #72, R1-130130, St Julian's, Malta, Source: ZTE, Title: HARQ timing in TDD-eIMTA, Agenda Item: 7.3.3.3, Document for: Discussion and Decision, Jan. 28,-Feb. 1, 2013 (4 pages).

3GPP TS 36.211 V11.3.0, Technical Specification, 3rd Generation Partnership Project; Technical Specification Group Radio Access Network; Evolved Universal Terrestrial Radio Access (E-UTRA); Physical Channels and Modulation (Release 11), Jun. 2013 (108 pages).

3GPP TS 36.213 V11.3.0, Technical Specification, 3rd Generation Partnership Project; Technical Specification Group Radio Access Network; Evolved Universal Terrestrial Radio Access (E-UTRA); Physical layer procedures (Release 11) Jun. 2013 (176 pages).

3GPP TS 36.331 V11.4.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2013 (346 pages).

3GPP TR 36.828 V11.0.0, Technical Report, 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11), Jun. 2012 (109 pages).

3GPP TSG-RAN Meeting #51, RP-110450, Kansas City, USA, Source: CATT, Ericsson, ST-Ericsson, Title: New study item proposal for Further Enhancements to LTE TDD for DL-UL Interference Management and Traffic Adaptation, Document for: Approval, Agenda Item: 14.2, Mar. 15-18, 2010 (6 pages).

* cited by examiner

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

DISCONTINUOUS RECEPTION CONFIGURATION

BACKGROUND

To conserve battery power at a user equipment (UE), discontinuous reception (DRX) operation can be performed at the UE. When the UE is connected to a wireless access network, the UE monitors for information (control information or data or both) transmitted by the wireless access network. When operating in DRX operation, the wireless receiver at the UE is activated for a certain period of time in a given cycle, and deactivated for another period of time in the given cycle. When activated, the wireless receiver at the UE is able to receive control information and data transmitted by a wireless access network. However, when deactivated, the wireless receiver at the UE is unable to receive control information and data by the wireless access network.

BRIEF DESCRIPTION OF THE DRAWINGS

Some embodiments are described with respect to the following figures.

FIG. 1 is a schematic diagram of different uplink-downlink configurations, according to some examples.

DETAILED DESCRIPTION

Figure 2:
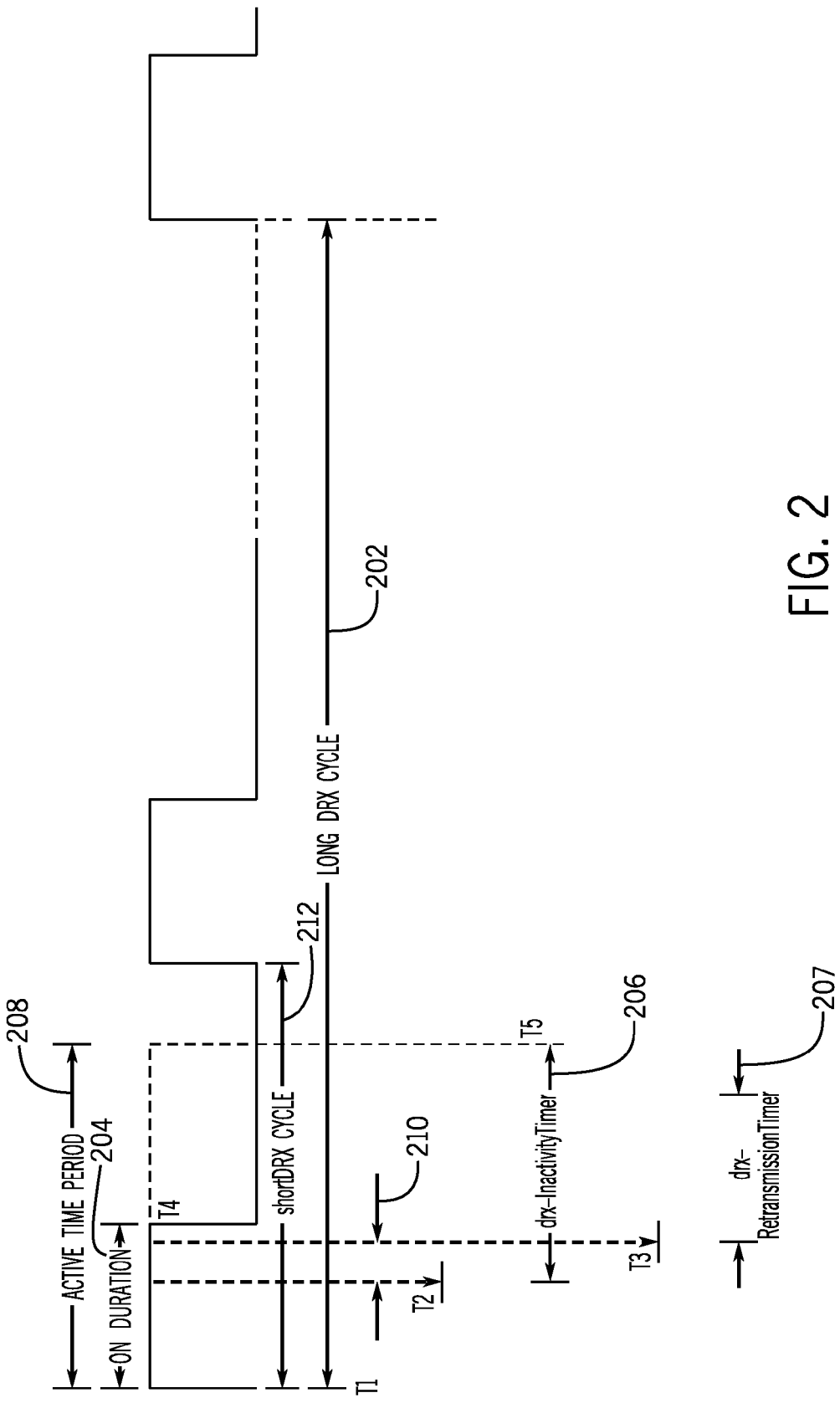
FIG. 2 is a schematic diagram illustrating discontinuous reception (DRX) operation, according to an example.

In a mobile communication system, downlink and uplink transmissions of information (control information or data or both) can be according to either a frequency division duplex (FDD) mode or a time division duplex (TDD) mode. Downlink transmission occurs from a wireless access network node to a user equipment (UE), while uplink transmission occurs from a UE to a wireless access network node. Examples of UEs can include any or some combination of the following: smartphones, personal digital assistants (PDAs), notebook computers, tablet computers, game appliances, smart watches, or any other devices capable of wireless communications. A wireless access network node is responsible for performing wireless transmissions and receptions with UEs.

In the FDD mode, uplink and downlink transmissions are separated in the frequency domain, by transmitting uplink information using a first carrier frequency, and transmitting downlink information using a second carrier frequency. In the TDD mode, on the other hand, both uplink and downlink transmissions occur on the same carrier frequency; however, uplink and downlink transmissions are separated in the time domain, by sending uplink and downlink transmissions in different time periods.

In a mobile communication network, different time division duplex (TDD) configurations may be employed. Such configurations can be referred to as TDD uplink-downlink (UL/DL) configurations (or more simply, UL/DL configurations), such as those used in a Long Term Evolution (LTE) network that operates according to LTE standards provided by the Third Generation Partnership Project (3GPP). The LTE standards are also referred to as the Evolved Universal Terrestrial Radio Access (E-UTRA) standards. Although reference is made to LTE (or E-UTRA) in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. If other wireless access technologies are used, then other types of wireless access network nodes are used.

An UL/DL configuration defines a number of uplink and downlink subframes that are included within a frame structure. According to E-UTRA, a frame structure is referred to as a radio frame, where the radio frame has a number of subframes. A subframe refers to a segment of an overall frame, where the segment has a specified time interval.

FIG. 1 shows an example table listing seven different UL/DL configurations that are used for TDD communications in an E-UTRA network. A first column 102 of the table shown in FIG. 1 identifies seven different UL/DL configurations (0-6). A second column 104 refers to the corresponding downlink-to-uplink switch-point periodicity (or more simply, "switching periodicity"), which represents a period in which the same switching pattern is repeated between the uplink and the downlink. According to E-UTRA, the switching periodicity can be 5 milliseconds (ms) or 10 ms. UL/DL configuration 1 has a 5 ms downlink-to-uplink switch-point periodicity, for example.

As depicted in a third column 106 in the table of FIG. 1, a frame is divided into 10 subframes, having subframe numbers 0-9. In the table, "D" represents a downlink subframe (for carrying downlink information from a wireless access network node to a UE), "U" represents an uplink subframe (for carrying uplink information from a UE to a wireless access network node), and "S" represents a special subframe which includes three parts: a downlink pilot time slot (DwPTS), an uplink pilot time slot (UpPTS), and a guard period (GP). Downlink transmissions e.g. on a physical downlink shared channel (PDSCH) can be made in a D subframe or in the DwPTS portion of a special subframe. The guard period (GP) of a special (S) subframe is to provide a transition interval between switching from downlink transmissions to uplink transmissions. Uplink transmissions can be made in a U subframe or in the UpPTS portion of a special subframe.

As can be seen in FIG. 1, certain UL/DL configurations support a larger number of downlink subframes than uplink subframes, while other UL/DL configurations support a larger number of uplink subframes than downlink subframes. UL/DL configuration 5 has the largest number of downlink subframes, while UL/DL configuration 0 has the largest number of uplink subframes.

The different UL/DL configurations provide for flexibility in terms of proportional resources assignable to uplink and downlink communications within a given assigned frequency spectrum. The different UL/DL configurations allow for distribution of radio resources unevenly between uplink and downlink communications. As a result, radio resources may be used more efficiently by selecting an appropriate UL/DL configuration based on traffic characteristics and interference conditions in uplink and downlink communications.

In an E-UTRA system, an UL/DL configuration for TDD mode communication can be semi-statically assigned every specified time interval. A wireless access network node can announce a change of the UL/DL configuration using system information (e.g. System Information Block Type 1 or SIB1) broadcast to UEs within the coverage area of the wireless access network node. The allowable minimum system information change periodicity is 640 milliseconds (ms), for example, according to the E-UTRA standards. In other words, within the 640-ms time interval, the UL/DL configuration assigned for communications within a particular cell stays static. However, keeping the UL/DL configuration static for such a relatively long time interval may not lead to efficient use of radio resources, particularly when the number of UEs is small and the traffic patterns of UEs within a cell are changing relatively rapidly.

For certain applications where traffic intensity in the uplink and downlink directions can change rapidly (e.g. web browsing communications, voice communications, network gaming communications, etc.), the semi-statically assigned UL/DL configuration (specified in system information) may lead to inefficient use of radio resources. To address the foregoing, dynamic UL/DL reconfiguration can be provided, in which the UL/DL configuration can be changed more frequently to adapt to traffic conditions. For example, dynamic UL/DL reconfiguration can be performed at a rate up to once every 10 ms, in some examples. More generally, dynamic UL/DL reconfiguration allows the UL/DL configuration to change at a rate that is greater than a rate possible with semi-static UL/DL reconfiguration using system information.

Dynamic UL/DL reconfiguration may cause issues with discontinuous reception (DRX) operation at a user equipment (UE). DRX operation refers to an operation of a UE in which a wireless receiver (e.g. radio receiver) in the UE can be turned on and off in respective different time periods or in which monitoring of a Physical Downlink Control Channel (PDCCH) can be turned on and off in respective different time periods. DRX operation is configured using DRX configuration parameters, which are communicated by a wireless access network node to a UE (or multiple UEs). DRX configuration parameters (or more simply, "DRX parameters") can be communicated in control messaging sent by a wireless access network node. A set of DRX configuration parameters together provide a "DRX setting" or "DRX configuration" of a UE.

An example of a control message for carrying DRX parameters can include a Radio Resource Control (RRC) message. An RRC message is used for establishing an RRC connection (a radio connection). RRC is described in 3GPP TS 36.331, in some examples.

DRX parameters can be dependent on the UL/DL configuration used. For example, values of the DRX parameters (that define the DRX configuration at a UE) can be set based on the specific UL/DL configuration signaled semi-statically in system information by a wireless access network node. However, when dynamic UL/DL reconfiguration is employed that causes the UL/DL configuration to change at a more rapid rate, current DRX parameters provided at a UE (which may have been signaled for a corresponding semi-static UL/DL configuration) may result in a DRX configuration at the UE that may be sub-optimal or that may lead to failure at the UE when the UL/DL configuration changes due to dynamic UL/DL reconfiguration.

Two types of UEs can be present in a mobile communication network that supports dynamic UL/DL reconfiguration. A first type of UE is referred to as a "legacy UE." A legacy UE is a UE that is not able to recognize signaling to perform dynamic UL/DL configuration changes. As a result, a legacy UE is not aware that the UL/DL configuration has been dynamically changed by a wireless access network node. Instead, the legacy UE follows the semi-static UL/DL configuration that was indicated by system information. As a result, DRX operation according to DRX parameters specified for the semi-static UL/DL configuration may cause the legacy UE to miss downlink information during an on time of the DRX operation in situations where the UE is expecting a downlink subframe (according to the semi-statically set UL/DL configuration) but a given subframe is actually an uplink subframe due to dynamic UL/DL configuration change.

In accordance with some implementations, techniques or mechanisms are provided to ensure that a legacy UE configured to perform DRX operations is able to successfully receive downlink information even when dynamic UL/DL configuration changes are specified by a wireless access network node serving the legacy UE.

Another type of UE is referred to as an "advanced UE," such as an Enhanced Interference Mitigation and Traffic Adaptation (eIMTA) UE. An advanced UE is able to recognize signaling from a wireless access network node specifying a dynamic UL/DL configuration change. For advanced UEs, techniques or mechanisms according to some implementations are provided to enable DRX parameters to be updated to reflect a current UL/DL configuration specified by a dynamic UL/DL configuration change. As a result, for advanced UEs, the DRX configuration can be dynamically adjusted in response to dynamic UL/DL configuration changes.

FIG. 2 illustrates an example DRX operation at a UE, and various DRX parameters that are used for controlling the DRX operation. Example DRX parameters can include: onDurationTimer; drx-InactivityTimer; hybrid automatic repeat request (HARQ) round trip time (RTT) timer; drx-RetransmissionTimer; shortDRX-Cycle; drxShortCycleTimer; and so forth. A long DRX cycle is represented as 202 in FIG. 2. A DRX cycle refers to a cycle of DRX operation that includes an active time period and an inactive time period. In the active time period, the wireless receiver of the UE is on (activated) and monitors PDCCH, while in the inactive time period, the wireless receiver of the UE is allowed to not monitor PDCCH and may be turned off (deactivated).

In the example of FIG. 2, a time T1 is the beginning boundary of the long DRX cycle 202. T1 may be the beginning boundary of the short DRX cycle if configured. At time T1, an onDurationTimer is started. The onDurationTimer is a timer that controls an on duration (represented as 204 in FIG. 2) in the DRX cycle. After the onDurationTimer has started and prior to expiration of the onDurationTimer, the wireless receiver of the UE remains on and monitors PDCCH. If no downlink information (control information or data or both) is received by the UE from a wireless access network node prior to expiration of the onDurationTimer, then expiration of the onDurationTimer will cause the wireless receiver of the UE to deactivate, which causes the UE to enter the inactive time period of the DRX cycle. In the inactive time period, the UE is in a DRX inactive state.

Downlink control information can be carried in a PDCCH, while downlink data can be carried in a Physical Downlink Shared Channel (PDSCH), for example.

However, if prior to expiration of the onDurationTimer, new downlink information is received (at time T2) by the UE, then another timer, referred to as a drx-InactivityTimer timer, is started. The drx-InactivityTimer specifies how long the UE should remain on after reception of the downlink information. As indicated by the example in FIG. 2, the drx-InactivityTimer can extend the active time period of the UE (extended from the on duration specified by the onDurationTimer). The length of the drx-InactivityTimer is represented as 206 in FIG. 2. The total active time period (represented as 208 in FIG. 2) of the DRX cycle is provided by the combination of the onDurationTimer and drx-InactivityTimer.

At time T2, another timer, referred to as a hybrid automatic repeat request (HARQ) round trip time (RTT) timer, is also started in response to receipt of the downlink information at the UE. The HARQ RTT timer specifies the minimum amount of time before a downlink HARQ retransmission is expected by the UE. HARQ provides for the provision of error detection and correction information from a transmitter to a receiver in association with transmitted data to allow the receiver to detect and possibly correct errors in the data. The receiver can send a positive acknowledgement (ACK) or a negative acknowledgement (NACK) in response to receiving the data. If the transmitter receives an ACK from the receiver in response to previously sent data, then the transmitter can transmit new data to the receiver. However, if the transmitter receives a NACK, then the HARQ process of the transmitter can retransmit the previously sent data.

The HARQ RTT timer specifies a length of time (indicated by 210 in FIG. 2) that is sufficient for the UE to: (1) decode downlink data, (2) send an acknowledgment (ACK or NACK) in response to the downlink data, and (3) wait for a start of a possible retransmission of the data (if a NACK was provided by the UE).

In the example of FIG. 2, time T3 is the time point following the HARQ RTT timer duration (210) following time T2 (when the HARQ RTT timer was started). Time T3 is the earliest time at which retransmission of data is expected to be received by the UE. At time T3, the HARQ RTT timer expires, and another timer, referred to as a drx-RetransmissionTimer, is started in response to expiration of the HARQ RTT timer if the data of the corresponding HARQ process was not successfully decoded. The drx-RetransmissionTimer specifies a maximum amount of time (indicated as 207 in FIG. 2) that the UE should remain active to wait for a retransmitted downlink data after a first available retransmission time. The retransmitted downlink data includes data retransmitted as part of the HARQ operation in response to an indication by the UE of failure to successfully decode previously transmitted data.

In the example of FIG. 2, at time T4, the onDurationTimer expires. Since the drx-InactivityTimer and drx-RetransmissionTimer have not expired, the UE remains active and continues to monitor PDCCH for downlink assignment or uplink grant.

If no new downlink data (e.g. PDCCH data) is received between time T2 and time T5, the drx-InactivityTimer expires at time T5. As a result, after time T5, the wireless receiver of the UE is allowed to not monitor PDCCH for downlink assignment or uplink grant. The UE may deactivate its receiver (to cause the UE to enter the inactive time period of the DRX cycle).

Note that the next active period can be the active time period of a next long DRX cycle, or the active time period of a next short DRX cycle (represented as 212) in FIG. 2. A short DRX cycle can be provided within an inactive time period of a long DRX cycle. Note that the short DRX cycle 212 may or may not be configured at the UE. The length of the short DRX cycle 212 is specified by a shortDRX-Cycle parameter. Another parameter, drxShortCycleTimer, specifies a consecutive number of subframes the UE should follow the short DRX cycle after the drx-InactivityTimer has expired.

Although an example DRX operation and respective DRX parameters are illustrated in FIG. 2, it is noted that in other examples, a different DRX operation can be controlled by different DRX parameters.

Dynamic Configuration of DRX Parameters

In accordance with some implementations, DRX configuration parameters at an advanced UE can be updated in accordance with dynamic UL/DL configuration changes. A wireless access network node may detect and select one or more advanced UEs whose traffic or quality of service (QoS) is not well served by the current semi-static UL/DL configuration, and the wireless access network node can start or activate dynamic UL/DL reconfiguration for the selected advanced UE(s).

Several general techniques can be used to update DRX parameters based on a current dynamic UL/DL configuration. A first technique is an implicit DRX reconfiguration technique, in which DRX parameters are dynamically updated at the UE in response to changing UL/DL configurations, without the use of any explicit signaling from a wireless access network node to the UE. A second technique is an explicit DRX signaling technique, in which explicit signaling from the wireless access network node is used to specify the DRX parameters to use.

Figure 3:
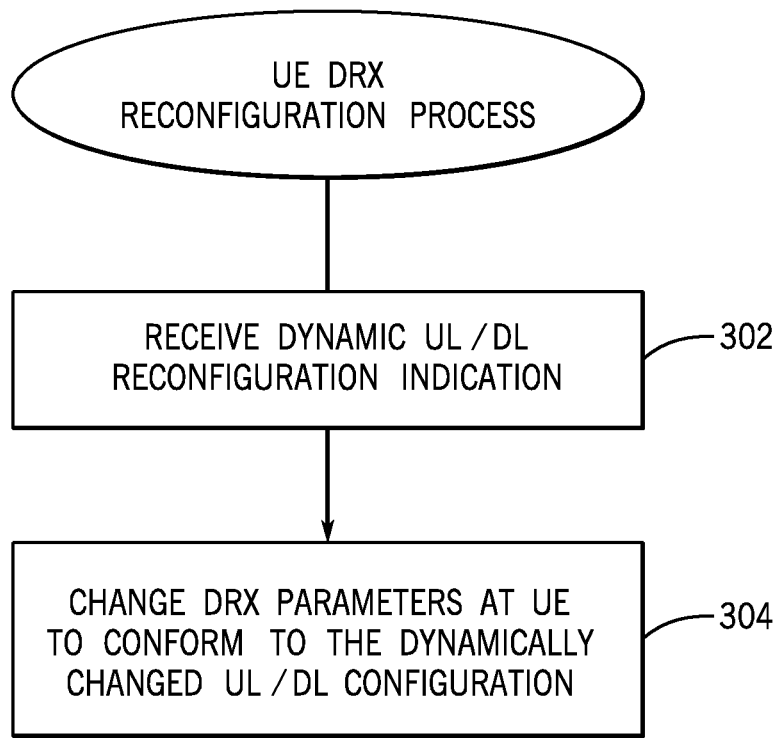
FIG. 3 is a flow diagram of reconfiguring DRX operation, according to some implementations.

FIG. 3 is a flow diagram of a DRX reconfiguration process that can be performed at a UE, according to some implementations. The UE receives (at 302) a dynamic UL/DL reconfiguration indication, to cause a dynamic change of the UL/DL configuration at the UE. The dynamic UL/DL reconfiguration indication can be a dynamic UL/DL reconfiguration message, an information element of another message, or some other type of indication. In some examples, the dynamic UL/DL reconfiguration can be included in a Layer 1 (L1) signaling, such as in PDCCH or ePDCCH (enhanced Physical Downlink Control Channel). Layer 1 refers to a physical layer of a protocol stack used in a wireless equipment (e.g. UE or wireless access network node). In other examples, the explicit signaling can be in the form of a message provided by a higher protocol layer in the protocol stack.

The UE changes (at 304) DRX parameters at the UE to conform to the dynamically changed UL/DL configuration. The change performed at 304 can be according to the implicit DRX reconfiguration technique or the explicit DRX reconfiguration technique.

Implicit DRX Reconfiguration Technique

The implicit DRX reconfiguration technique involves specifying a set of DRX parameters for each of multiple UL/DL configurations. In some examples, a mapping can be provided between UL/DL configurations and respective sets of DRX parameters. As the UL/DL configuration is changed, such as by UL/DL reconfiguration signaling, a new set of DRX parameters can be automatically selected according to the UL/DL configuration change. With the implicit DRX reconfiguration technique, no DRX reconfiguration signaling has to be sent from the wireless access network node to the UE to modify the DRX parameters used by the UE in response to the UL/DL configuration change.

In some examples, the mapping between UL/DL configurations and DRX parameter sets can be in the form of a lookup table, such as Table 1 depicted below. In other examples, the mapping can be provided in a different data structure.

TABLE 1

| UL/DL Configuration | DRX Parameter Set |
| --- | --- |
| 0 | Set 0 |
| 1 | Set 1 |
| 2 | Set 2 |
| 3 | Set 3 |
| 4 | Set 4 |
| 5 | Set 5 |
| 6 | Set 6 |

The mapping can be sent from a wireless access network node to a UE. Alternatively, the mapping may be preconfigured at the UE.

In the forgoing lookup table, different UL/DL configurations are mapped to different DRX parameter sets. Each DRX parameter set specifies values of DRX parameters, which defines a DRX configuration of a UE. Although Table 1 shows different UL/DL configurations being mapped to different DRX parameter sets, it is noted that in other examples, multiple UL/DL configurations can be mapped to the same DRX parameter set. In other examples, two or more DRX parameter sets can include the same DRX parameter values.

For example, UL/DL configurations 2, 3, and 4 may share the same DRX parameter values because the number of uplink subframes within a radio frame of those configurations is the same or similar. As another example, UL/DL configurations 0 and 5 may share the same DRX parameter values because the degree of difference between the number of downlink subframes and the number of uplink subframes is relatively large.

Upon reception of an indication of a dynamic UL/DL configuration change, an advanced UE can select the respective DRX parameter set as specified in Table 1 above. Current DRX parameter values are replaced with the parameter values of the selected DRX parameter set. If any DRX timer is running, the respective new parameter value from the selected DRX parameter set can be applied upon expiration or restart of the DRX timer, which may cause the DRX timer to be lengthened or shortened.

In further alternative implementations, a given dynamic UL/DL configuration can be mapped (such as by a lookup table) to multiple DRX parameter sets. Thus, when a UE detects a dynamic UL/DL configuration change, the UE can select one of the multiple DRX parameter sets corresponding to the new dynamic UL/DL configuration. In some examples, a wireless access network node can signal the UE with a selection indication to assist the UE in selecting one of the multiple DRX parameter sets corresponding to the new dynamic UL/DL configuration. The selection indication can be included in downlink control information (DCI) sent by the wireless access network node to the UE. Alternatively, the selection indication can be included in TDD reconfiguration signaling, similar to a technique discussed further below in connection with FIG. 4.

The DRX parameters may be restored to values specified in RRC messaging in response to a UE detecting that dynamic UL/DL reconfiguration is deactivated. If any affected DRX timer is still running upon reversion to the RRC-specified DRX parameter configuration, the reversion to the respective value of the RRC-specified DRX parameter configuration may be performed upon expiration or restart of the DRX timer.

In alternative implementations, in response to a UE detecting that dynamic UL/DL reconfiguration is deactivated, the DRX parameter configuration used at the UE may be set according to the DRX parameter set corresponding to the latest dynamic UL/DL configuration.

In other implementations, instead of using a lookup table such as Table 1 above, the DRX parameter set that is used at a UE in response to a dynamic UL/DL configuration change can be the DRX parameter set signaled in an RRC message by a wireless access network node. The objective of varying the DRX parameters in response to a dynamic UL/DL configuration change is to prevent a UE from missing an opportunity to receive downlink information, or to allow the DRX configuration to be adapted to a changing traffic pattern.

More generally, the DRX parameter values used for a specific UL/DL configuration can be based on one or more of the following factors:
- a degree of difference between the subframe direction of a current dynamic UL/DL configuration and the subframe direction of a semi-static UL/DL configuration indicated by system information (e.g. SIB1);
- a degree of difference between the subframe direction of a current dynamic UL/DL configuration and the subframe direction of a previous dynamic UL/DL configuration; and
- a number of uplink subframes and a number of downlink subframes of the current dynamic UL/DL configuration.

The "subframe direction" of an UL/DL configuration refers to an indication based on the number of uplink subframes and the number of downlink subframes in the UL/DL configuration. The "degree of difference" between the subframe direction of a first UL/DL configuration and the subframe direction of a second UL/DL configuration provides a measure that compares the numbers of uplink and downlink subframes of the first UL/DL configuration with the numbers of uplink and downlink subframes of the second UL/DL configuration.

For example, to serve downlink intensive traffic for one or more UEs, at least one of the following DRX parameters may be configured to have a larger value: onDurationTimer, drx-InactivityTimer and drx-RetransmissionTimer. Additionally, at least one of the length of the long DRX cycle and the length of the short DRX cycle may be specified to be smaller. Moreover, to keep the UE in short DRX cycles as much as possible, a longer value for drxShortCycleTimer may be used.

In a different example, to serve uplink intensive traffic for one or more UEs, a larger value may be specified for at least one of onDurationTimer and drx-InactivityTimer. Additionally, at least one of the length of the long DRX cycle and the length of the short DRX cycle may be specified to be smaller. Moreover, to keep the UE in short DRX cycles as much as possible, a longer value for drxShortCycleTimer may be used.

In alternative implementations, instead of mapping UL/DL configurations to respective DRX parameter sets (such as according to the Table 1 above), groups of UL/DL configurations can be mapped to respective DRX parameter sets. For example, a group of UL/DL configurations can include a pair of a current dynamic UL/DL configuration and a semi-static UL/DL configuration (as specified in system information). As another example, a group of UL/DL configurations can include a pair of a current dynamic UL/DL configuration and a previous dynamic UL/DL configuration.

An example of mapping pairs of a current dynamic UL/DL configuration and a previous UL/DL configuration to DRX parameter sets is provided in Table 2 below:

TABLE 2

| Current UL/DL configuration | Previous UL/DL configuration | | | | | | |
|---|---|---|---|---|---|---|---|
| | 0 | 1 | 2 | 3 | 4 | 5 | 6 |
| 0 | — | Set 10 | Set 20 | Set 30 | Set 40 | Set 50 | Set 60 |
| 1 | — | — | Set 21 | Set 31 | Set 41 | Set 51 | — |
| 2 | — | — | — | Set32 | Set42 | Set52 | — |
| 3 | — | Set 13 | Set 23 | — | Set 43 | Set 53 | — |
| 4 | — | — | Set 24 | — | — | Set 54 | — |
| 5 | — | — | — | — | — | — | — |
| 6 | — | Set 16 | Set 26 | Set 36 | Set 46 | Set 56 | — |

In Table 2, each of rows 0-6 specifies a respective current UL/DL configuration 0-6, and each of columns 0-6 specifies a respective previous UL/DL configuration, where the previous UL/DL configuration can be a semi-static UL/DL configuration specified by system information, or a previous dynamic UL/DL configuration. Each pair of a current UL/DL configuration and previous UL/DL configuration maps to a respective entry of Table 2.

In Table 2, an entry that includes "-" indicates that no adjustment of the DRX configuration has to be performed in response to the UL/DL configuration change represented by the respective pair of the current UL/DL configuration and previous UL/DL configuration. For example, if the UL/DL configuration change is from (previous) UL/DL configuration 1 to (current) UL/DL configuration 2, no adjustment of the DRX configuration has to be performed because the set of downlink subframes of UL/DL configuration 2 is a superset of the set of downlink subframes of UL/DL configuration 1.

Generally, according to the example of Table 2, an adjustment of the DRX configuration is performed in response to an UL/DL configuration change that results in the following condition: the subframe at a given subframe position in the current UL/DL configuration is an uplink subframe, while the subframe at the given subframe position in the previous UL/DL configuration is a downlink subframe.

As with Table 1, some DRX parameter sets in Table 2 may share the same parameter values. For example, each DRX parameter set 2x may share the same parameter values as each corresponding DRX parameter set 4x, where x is a value from 0 to 6.

In other implementations, instead of adjusting the DRX configuration in response to a dynamic UL/DL configuration change, a UE may temporarily halt DRX operation configuration in response to detecting the dynamic UL/DL configuration change. Halting DRX operation results in the UE remaining in continuous receiving mode, in which the UE maintains its wireless receiver active to allow the UE to receive downlink information. The UE may resume DRX operation when dynamic UL/DL reconfiguration is deactivated.

In some scenarios, an advanced UE that is in a connected mode (e.g. an RRC CONNECTED state) may not be actively transmitting or receiving any information. In an RRC connected state, a radio connection is established between the UE and a wireless access network node. When a radio connection is established, resources are assigned for carrying traffic data between the UE and the wireless access network node. When the advanced UE is in a connected mode but is not actively communicating information, the wireless access network or the UE may maintain the UL/DL configuration of the UE the same as the semi-static UL/DL configuration specified by system information, and its DRX configuration the same as the RRC-specified configuration, until some traffic is to be communicated for the UE.

If there are multiple UEs for which dynamic UL/DL reconfiguration is to be performed, to align the UL/DL configuration changes among the multiple UEs that are actively transmitting or receiving information, a wireless access network node may indicate a common subframe in which each of the UEs is to monitor a control channel, such as the PDCCH, for UL/DL configuration changes. As an example, the dynamic UL/DL configuration change indication may be sent on the PDCCH in a common search space or the ePDCCH, with a new Radio Network Temporary Identifier (RNTI), which can be decoded by the group of multiple UEs.

Explicit DRX Reconfiguration Technique

The foregoing describes an implicit DRX reconfiguration technique. In alternative implementations, an explicit DRX reconfiguration technique can be used, in which explicit signaling can be used to indicate the dynamic DRX configuration to use in response to dynamically changing UL/DL configurations. In some examples, Layer 1 (L1) signaling can be used. For example, the L1 signaling can be provided in PDCCH. In other examples, the explicit signaling can be in the form of a message provided by a higher protocol layer in the protocol stack.

An example of L1 signaling that can be used includes downlink control information (DCI) sent by the wireless access network node in the PDCCH or ePDCCH. The DCI can include a field, referred to as a TDD reconfiguration field, used for carrying an indication of a current dynamic UL/DL configuration to use. In accordance with some implementations, a modified form of the TDD reconfiguration field is used, such as a TDD reconfiguration field 400 shown in FIG. 4.

Figure 4:
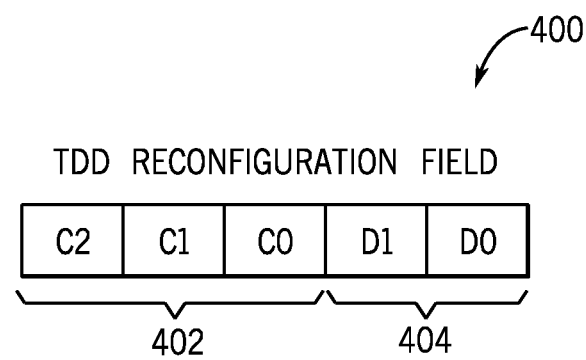
FIG. 4 is a schematic diagram of an example time division duplex (TDD) configuration field, according to some implementations.

The TDD reconfiguration field 400 includes a first part 402 and a second part 404. The first part 402 specifies the dynamic UL/DL configuration to use, and is made up of bits C2, C1, and C0. The second part 404 is used to specify the dynamic DRX configuration to use, and includes bits D1 and D0. Although specific numbers of bits are shown in the example of FIG. 4, it is noted that in alternative implementations, different numbers of bits can be used to specify the dynamic UL/DL configuration and/or the dynamic DRX configuration.

The number of the bits included in the second part 404 depends on how many DRX parameter sets are available to choose from. If the available DRX parameter sets is P (P>1), then the number of bits (N) included in the second part 404 is $$N=\text{ceiling}(\log_2 P).$$

The TDD reconfiguration field 400 can be included in a new DCI format or an existing DCI format. A new DCI format is a format that is not specified by current standards, but which may or may not be specified by future standards. An existing DCI format is a format that is specified by current standards.

As an example, if a new DCI format based on a new RNTI is used for carrying the TDD reconfiguration field 400, the new DCI format with the TDD reconfiguration field 400 can be transmitted in a specific control region which is common to advanced UEs. Advanced UEs are able to search for the TDD reconfiguration field 400 in this common search space, or alternatively, in a dedicated search space.

As an alternative example, the TDD reconfiguration field 400 can be inserted into one or more of some existing DCI formats.

Although FIG. 4 shows the two parts 402 and 404 as being part of the TDD reconfiguration field 400, it is noted that the first part 402 (for specifying a dynamic UL/DL configuration) and the second part 404 (for specifying a dynamic DRX configuration) can be signaled separately.

Alternatively, existing DCI formats may be extended to include an indicator for dynamic UL/DL reconfiguration. The indicator may include: (1) a bit to indicate the start or stop of a dynamic UL/DL reconfiguration, and (2) if the bit indicates the start of the dynamic UL/DL reconfiguration, a TDD configuration index to specify the UL/DL configuration to use, and a DRX parameter set identity to indicate the DRX parameter set to use. The indicator may be conveyed to a specific UE using the UE's cell RNTI (C-RNTI) or conveyed in a common search space that can be decoded by multiple UEs. The new UL/DL configuration and new DRX configuration may be started or stopped at the beginning of the next radio frame. If stopped, the UE can resume using the UL/DL configuration specified by system information, or alternatively, the UE can continue to use the current UL/DL configuration.

Using Multiple Retransmission Windows

The foregoing describes techniques in which DRX parameters are adjusted (to change the DRX configuration) based on dynamic UL/DL configuration changes. In alternative implementations, instead of dynamically adjusting DRX parameters to correspond to dynamically changing UL/DL configurations, multiple retransmission windows can be configured to address the situation where a UE may have missed a downlink retransmission opportunity due to a change in UL/DL configuration. In such alternative implementations, the DRX configuration provided at a UE is one in which the UE is awakened to a DRX active state for multiple retransmission windows due to failure to receive retransmitted data.

As discussed above, according to an HARQ procedure, a receiver can send a positive acknowledgement (ACK) or a negative acknowledgement (NACK) in response to receiving data. If the transmitter receives an ACK from the receiver in response to previously sent data, then the transmitter can transmit new data to the receiver. However, if the transmitter receives a NACK, then the HARQ process of the transmitter can retransmit the previously sent data.

The HARQ RTT timer specifies a length of time that is sufficient for the UE to: (1) decode downlink data, (2) send an acknowledgment (ACK or NACK) in response to the downlink data, and (3) wait for a start of a possible retransmission of the data (if a NACK was provided by the UE).

Upon expiration of the HARQ RTT timer, the drx-RetransmissionTimer is started if the corresponding data has not been successfully decoded. The drx-RetransmissionTimer specifies a maximum amount of time that the UE should remain active to wait for an incoming retransmitted data after a first available retransmission time. Effectively, the drx-RetransmissionTimer provides a retransmission window in which the UE can expect to receive retransmitted data.

Figure 5:
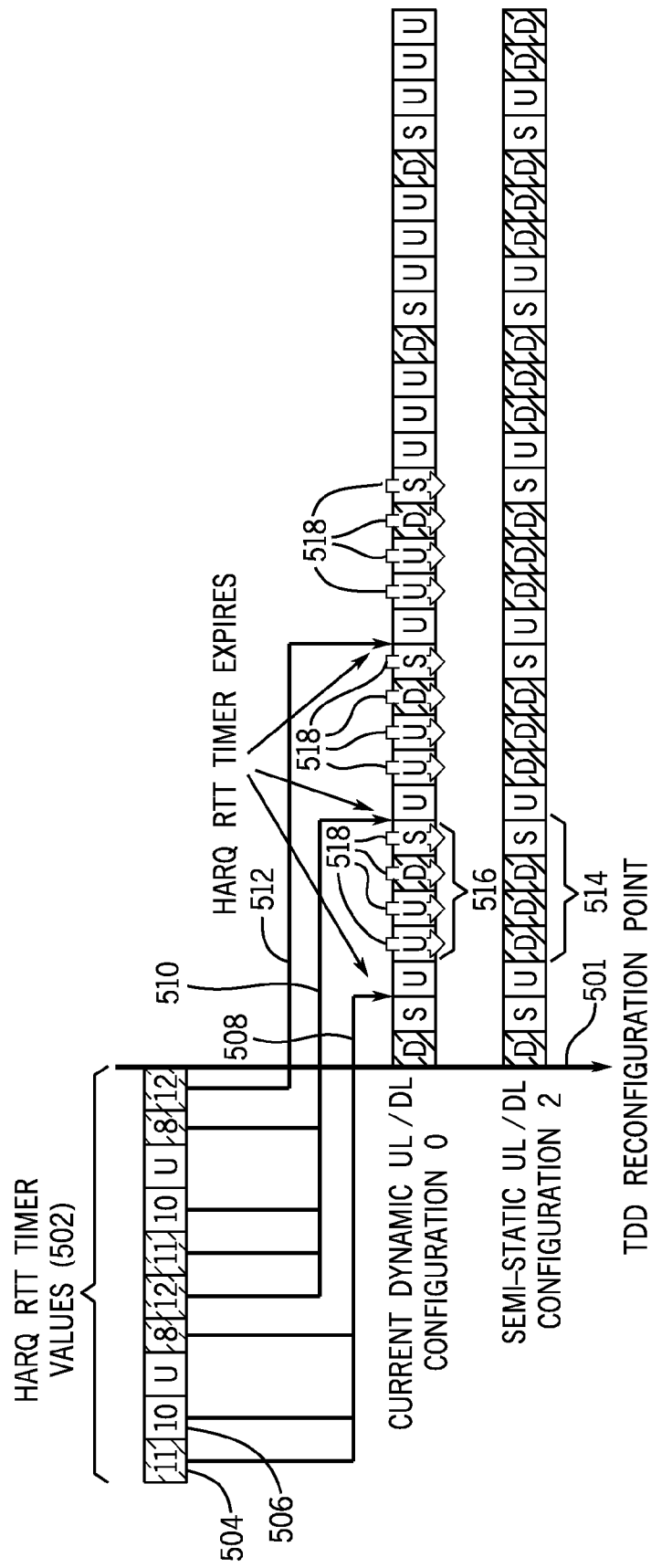
FIG. 5 is a schematic diagram of example sequences of subframes and values of a hybrid automatic repeat request (HARQ) round trip time (RTT) timer and drx-Retransmission timer operation.

An example of a legacy UE missing a retransmission window as a result of a dynamic UL/DL configuration change is illustrated in FIG. 5. In this example, the initial UL/DL configuration (as specified by system information) is UL/DL configuration 2, and a dynamic UL/DL configuration change (at 501) causes a change to UL/DL configuration 0. Because the legacy UE does not recognize signaling relating to the dynamic UL/DL configuration change, the legacy UE continues to operate according to UL/DL configuration 2, while the wireless access network node is operating according to UL/DL configuration 0.

Example values (502) of the HARQ RTT timer (for PDSCH transmissions in respective subframes) are illustrated in FIG. 5. In FIG. 5, hashed boxes represent downlink subframes, white boxes represent special subframes, and boxes containing "U" represent uplink subframes. The example HARQ RTT timer values 502 are specified for downlink and special subframes. For example, for downlink subframe 0 (504), in which a PDSCH transmission has been sent by a wireless access network node, the HARQ RTT timer is 11 (which indicates that the HARQ RTT timer is to count 11 subframes before expiring). For special subframe 1 (506), the HARQ RTT timer is 10. Arrows 508, 510, and 512 identify expiration points of respective HARQ RTT timers.

Vertical downward arrows 518 in FIG. 5 represent ticks (counts) of the drx-RetransmissionTimer. As noted above, the drx-RetransmissionTimer starts counting following expiration of the HARQ RTT timer. In the example of FIG. 5, it is assumed that the drx-RetransmissionTimer is to count four subframes (four ticks 518), which define the retransmission window for receipt of data retransmission from the wireless access network node.

As can be seen from the example of FIG. 5, a sequence 514 of three consecutive downlink ("D") subframes and a special ("S") subframe in UL/DL configuration 2 (the UL/DL configuration perceived by the legacy UE) corresponds to a sequence 516 of two uplink ("U") subframes, a downlink subframe, and a special subframe in UL/DL configuration 0 (the current UL/DL configuration due to the dynamic UL/DL configuration change).

This sequence 514 or 516 of subframes corresponds to a retransmission window provided by the drx-Retransmission- Timer following expiration of the HARQ RTT timer indicated by arrow 508. If the retransmission window is long enough, then the legacy UE would be able to receive a downlink retransmission in the downlink or special subframe of the sequence 516 of subframes in the current dynamic UL/DL configuration, even though the legacy UE is expecting the sequence 514 of subframes (of UL/DL configuration 0). However, if the retransmission window is not greater than two subframes, then the legacy UE would miss the downlink retransmission, since the first two subframes following expiration of the HARQ RTT timer indicated by arrow 508 are uplink subframes in UL/DL configuration 0.

Thus, to ensure that the legacy UE does not miss a retransmission window, the drx-RetransmissionTimer has to be set large enough to ensure that there are available downlink or special subframes in the current dynamic UL/DL configuration to allow the legacy UE to receive a downlink retransmission. In some cases, even if the drx-RetransmissionTimer is set to provide a larger retransmission window, there may be more downlink HARQ processes than available downlink and special subframes during a retransmission window. In this case, the legacy UE may still miss a downlink retransmission even if the drx-RetransmissionTimer is set to a larger value.

Traditionally, the HARQ RTT timer at a UE for performing a downlink HARQ procedure is only started when a PDCCH and PDSCH (transmitted by the corresponding HARQ process at the wireless access network node) are received at the UE. The HARQ RTT timer ensures that the UE is awake for a retransmission window (provided by the drx-RetransmissionTimer) in which a downlink HARQ retransmission can potentially occur. However, if this retransmission window is missed by the UE, then the UE cannot be awakened from a DRX inactive state, and may miss the downlink retransmission.

Consider an example where a dynamic UL/DL reconfiguration results in going from a downlink-heavy UL/DL configuration (an UL/DL configuration where there is a much larger number of downlink and special subframes than uplink subframes) to a less downlink-heavy UL/DL configuration. This may cause potential problems with downlink HARQ retransmissions if the amount of downlink HARQ retransmissions for downlink HARQ processes cannot be carried in resources available in a retransmission window. As a result, not all of the downlink HARQ retransmissions can be successfully performed before the UE enters a DRX inactive state.

In accordance with some implementations, a mechanism is provided to awaken a UE from a DRX inactive state if the UE missed a previous downlink retransmission. The awakened UE is provided with a subsequent retransmission window so that the UE has the opportunity to receive the downlink HARQ retransmission in the subsequent retransmission window.

In some implementations, the HARQ RTT timer is started and restarted a specified number of times (as specified by a timer restart parameter), based on a triggering condition. The timer restart parameter can be a predefined parameter, or a configurable parameter that can be configured by a wireless access network node. Restarting the HARQ RTT timer allows another retransmission window to be provided for the UE to give the UE another opportunity to receive a downlink HARQ retransmission.

For example, assume that the timer restart parameter is set to two, which means that the HARQ RTT timer can be started and restarted up to two times. The UE receives a PDCCH and PDSCH and starts the HARQ RTT timer. The UE cannot successfully decode the PDSCH. Upon expiration of the HARQ RTT timer, a first retransmission window is started for the UE to receive a downlink HARQ retransmission. The UE may fail to receive the downlink HARQ retransmission in the first retransmission window, such as due to there being no downlink or special subframe available within the first retransmission window (which can occur due to a dynamic UL/DL reconfiguration) or if the wireless access network node did not send the downlink HARQ retransmission (such as due to there being insufficient resources in the first retransmission window for multiple downlink HARQ retransmissions that have to be made by respective downlink HARQ processes).

Due to detection of the failure to receive the expected downlink HARQ retransmission, the UE can restart the HARQ RTT timer, at either the start or end of the first retransmission window. For example, the HARQ RTT timer can be restarted at the end of the first retransmission window if the HARQ RTT timer has not already been restarted during the first retransmission window due to reception of a downlink HARQ retransmission.

Restarting the HARQ RTT timer can awaken the UE from a DRX inactive state. Expiration of the restarted HARQ RTT timer causes a second retransmission window to be provided for the UE.

Figure 6:
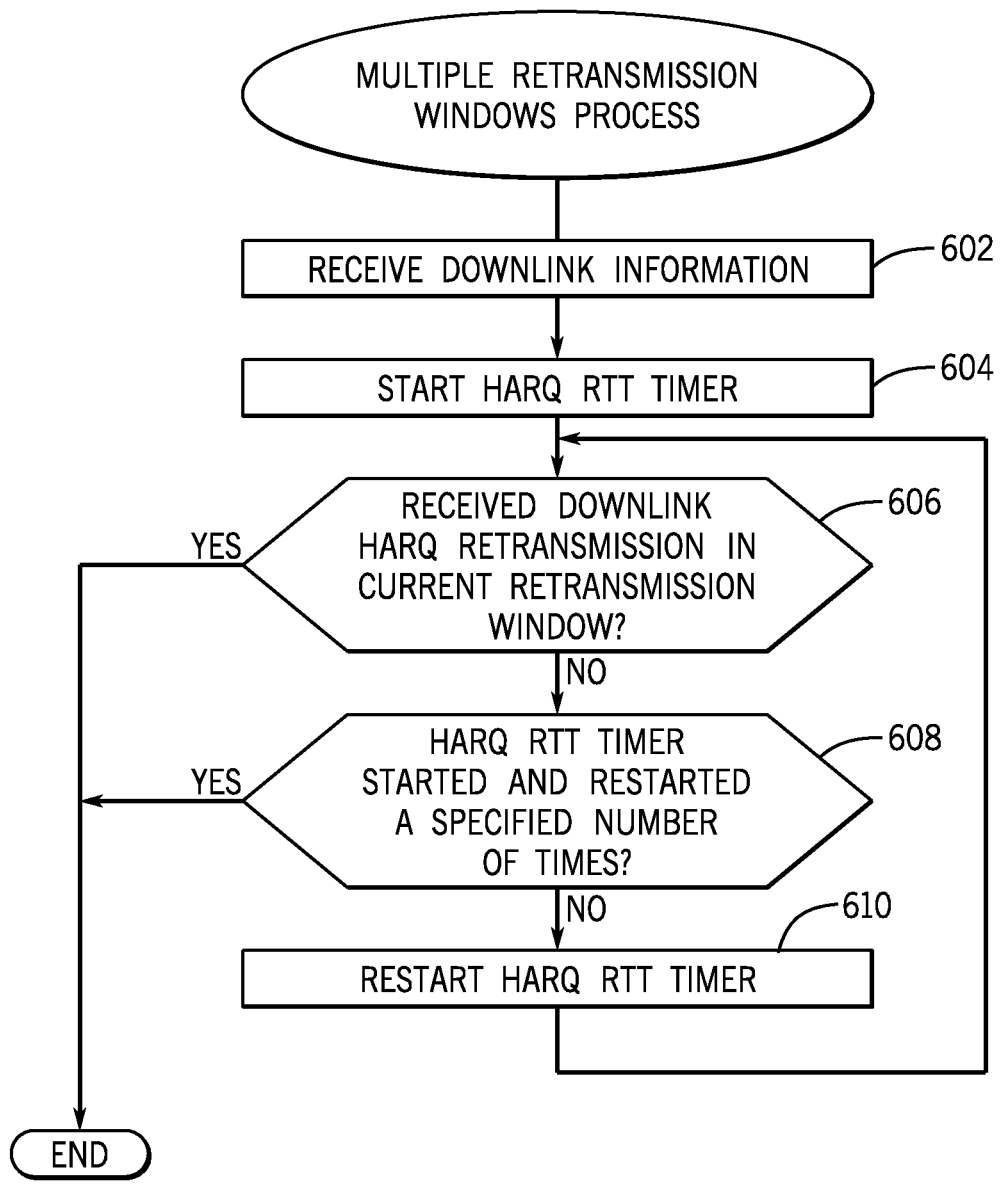
FIG. 6 is a flow diagram of a process for providing multiple retransmission windows, according to some implementations.

FIG. 6 is a flow diagram of a process for using multiple retransmission windows to increase the likelihood that a UE successfully receives a downlink HARQ retransmission. The UE receives (at 602) downlink information (e.g. PDCCH and PDSCH). In response, the UE starts (at 604) its HARQ RTT timer (such as at time T2 in the example of FIG. 1). Upon expiration of the HARQ RTT timer, the drx-RetransmissionTimer is started to provide a retransmission window if the corresponding data has not been successfully decoded. The UE remains awake for a potential downlink HARQ retransmission.

In the operation of FIG. 6, it is assumed that the UE has provided a NACK in response to failure to decode a received PDSCH data. As a result, the UE is expecting a downlink HARQ retransmission of the previously sent PDSCH data. The downlink HARQ retransmission is expected in the current retransmission window that is started upon expiration of the HARQ RTT timer.

The UE determines (at 606) that it has not received a downlink HARQ retransmission in the current retransmission window. In response to such determination, the UE determines (at 608) whether the HARQ RTT timer has previously been started and restarted a specified number of times. If not, then the UE restarts (at 610) the HARQ RTT timer, which maintains the UE awake for a subsequent retransmission window. The process returns to task 606, where the UE determines whether it has received the expected downlink HARQ retransmission in the current retransmission window.

If the UE determines (at 606) that it has received the expected downlink HARQ retransmission, then the process of FIG. 6 ends. If the UE determines that it has not received the expected downlink HARQ retransmission in the current retransmission window, but that the HARQ RTT timer has already been started and restarted the specified number of times, then the process of FIG. 6 ends.

In some implementations, each restart of the HARQ RTT timer causes the HARQ RTT timer to count the same amount of time as the first start of the HARQ RTT timer. Alternatively, a restarted HARQ RTT timer can be configured to count for a smaller amount of time. Another alternative is to restart the drx-Retransmission timer immediately after the previous drx-Retransmission timer expires.

In general, according to some aspects, a UE determines whether the UE has received a downlink retransmission of data from a wireless access network node in a first retransmission window. In response to determining that the UE has not received the downlink retransmission of data in the first retransmission window, the UE causes a second retransmission window to be provided for the UE to receive the downlink retransmission of data if configured to do so.

According to further aspects, a timer is restarted to cause the second transmission window to be provided.

According to further aspects, the timer that is restarted is an HARQ RTT timer.

According to further aspects, the timer is restarted in response to determining that the timer has not already been started and restarted a specified number of times.

UL/DL Configuration Restriction

As discussed above, a legacy UE may not be able to recognize dynamic UL/DL configuration changes. As a result, the legacy UE continues to assume that the semi-static UL/DL configuration (as indicated by system information) is used even if the wireless access network has signaled a dynamic UL/DL reconfiguration. This can lead to improper operation at the legacy UE.

Figure 7:
FIG. 7 is a schematic diagram of example uplink-downlink configurations perceived by an advanced user equipment (UE) and a legacy UE, before and after a dynamic uplink-downlink configuration change.

FIG. 7 shows an example in which a legacy UE may be unable to receive a downlink transmission during a DRX active time period due to a dynamic UL/DL configuration change. FIG. 7 shows the UL/DL configuration perceived by each of an advanced UE and a legacy UE. Initially, it is assumed that the semi-static UL/DL configuration, as specified by system information, is UL/DL configuration 5. At this initial stage, both the advanced UE and the legacy UE employ UL/DL configuration 5.

However, at some later point in time, a dynamic UL/DL configuration change is performed to UL/DL configuration 0. After the dynamic UL/DL configuration change is performed, the advanced UE employs UL/DL configuration 0, but the legacy UE continues to use UL/DL configuration 5.

In the example of FIG. 7, it is assumed that a DRX cycle is set at 128 ms. Two possible example values of the on duration (as specified by the onDurationTimer discussed further above) are specified: 2 ms and 8 ms. After the first DRX cycle (represented as 702 in FIG. 7), the legacy UE awakens (at time point 704) from the DRX inactive state. After awakening, if the on duration is 2 ms, the legacy UE remains in the DRX active state during the 2-ms interval 706, but transitions to the DRX inactive state at time point 708.

While the legacy UE is in the DRX active state during the 2-ms interval 706, the legacy UE expects downlink transmissions in downlink subframes 710, since the legacy UE is still operating according to the semi-static UL/DL configuration 5 despite the dynamic reconfiguration to UL/DL configuration 0. However, in UL/DL configuration 0, the subframes at the corresponding locations are uplink subframes 712, which means that the legacy UE will not be able to perform downlink communications during the 2-ms interval 706. The legacy UE is in the inactive time period for the remainder of the DRX cycle. In this example, the legacy UE will not be able to receive any downlink transmissions from a wireless access network node.

If the on duration is 8 ms in a different example, then the legacy UE will be in the DRX active state for an 8-ms interval 714, which allows the legacy UE to have four available subframes (716, 718) for receiving downlink transmissions after the dynamic UL/DL configuration change to UL/DL configuration 0. Note that the four available subframes (716, 718) for receiving downlink transmissions in UL/DL configuration 0 is less than the eight available subframes (720, 722) for receiving downlink transmissions in UL/DL configuration 5.

As a result of dynamic UL/DL configuration change, a legacy UE may miss a downlink transmission (e.g. PDCCH or PDSCH transmission) during a DRX active time period of the UE. Additionally, as discussed above in connection with FIG. 5, a legacy UE may also miss a downlink HARQ retransmission during a retransmission window.

Missing a downlink transmission is more likely to occur when a dynamic UL/DL configuration change is from a downlink-heavy UL/DL configuration to a less downlink-heavy UL/DL configuration.

To address the foregoing, the UL/DL configuration useable at a UE may be restricted to one or more specified UL/DL configurations. For example, in some implementations, to allow for a dynamic UL/DL configuration change to any of UL/DL configurations 0 to 6, a wireless access network node may be configured to specify that the default semi-static UL/DL configuration (as indicated in system information such as SIB1) is UL/DL configuration 0. The downlink subframes of UL/DL configuration 0 is always a subset of any one of other existing six UL/DL configurations. Therefore, by restricting the default semi-static UL/DL configuration to UL/DL configuration 0, a legacy UE would not miss any downlink transmissions during a DRX active time period or miss downlink HARQ retransmissions during a retransmission window.

Figure 8:
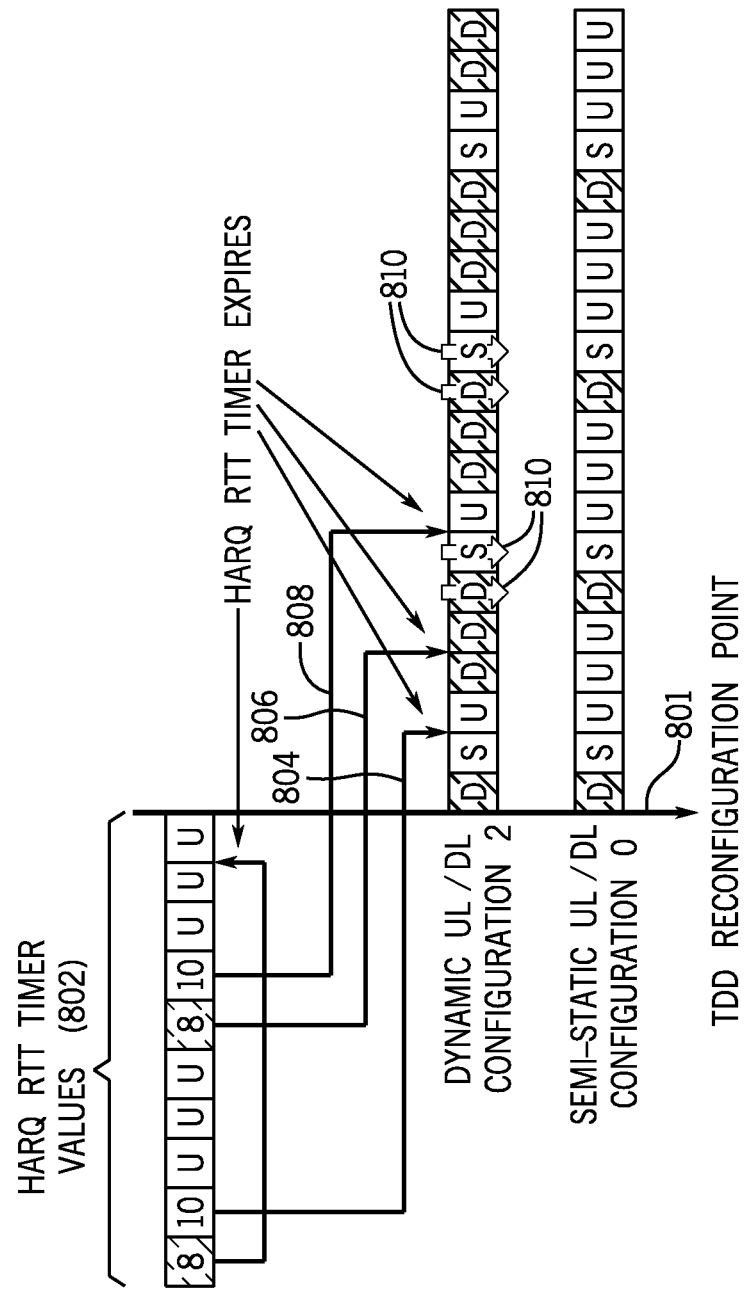
FIG. 8 is a schematic diagram of example sequences of subframes and values of an HARQ RTT timer, in implementations where a semi-static uplink-downlink configuration specified by system information is restricted to uplink-downlink configuration 0.

FIG. 8 shows an example in which the default semi-static UL/DL configuration is set as configuration 0, and a dynamic UL/DL configuration change (801) causes a change to UL/DL configuration 2. FIG. 8 is similar to FIG. 5 discussed further above, and shows example HARQ RTT timer values 802 for respective downlink subframes (represented by hashed boxes) and special subframes (white boxes).

Arrows 804, 806, and 808 represent expiration time points of respective HARQ RTT timers. Vertical downward arrows 810 represent ticks of a drx-RetransmissionTimer, which is started after expiration of an HARQ RTT timer. In the example of FIG. 8, the downlink subframes of dynamic UL/DL configuration 2 (after the dynamic UL/DL configuration change) during which the drx-RetransmissionTimer counts (810), are aligned with the downlink subframes of the semi-static UL/DL configuration 0. As a result, by restricting the semi-static UL/DL configuration to UL/DL configuration 0, it can be ensured that the legacy UE will be able to receive downlink transmissions during the retransmission window provided by the drx-RetransmissionTimer.

In alternative implementations, instead of restricting the semi-static UL/DL configuration specified by system information, the system information can specify any UL/DL configuration. However, the dynamic UL/DL configuration to which a UE can be transitioned depends on the semi-static UL/DL configuration that is specified. Table 4 provides the choice of dynamic TDD reconfiguration for a given SIB1 TDD configuration:

TABLE 4

| Semi-static UL/DL Configuration | Permitted Dynamic UL/DL Configuration |
| --- | --- |
| 0 | 0, 1, 2, 3, 4, 5, 6 |
| 1 | 1, 2, 4, 5 |
| 2 | 2, 5 |

TABLE 4-continued

| Semi-static UL/DL Configuration | Permitted Dynamic UL/DL Configuration |
|---|---|
| 3 | 3, 4, 5 |
| 4 | 4, 5 |
| 5 | 5 |
| 6 | 1, 2, 3, 4, 5 |

In Table 4 above, the first column specifies various semi-static UL/DL configurations that can be indicated in system information (e.g. SIB1). The second column of Table 4 identifies the permitted dynamic UL/DL configurations for each respective semi-static UL/DL configuration.

More generally, a mapping is provided between each semi-static UL/DL configuration and respective one or more dynamic UL/DL configurations. Assuming that the system information indicates that semi-static UL/DL configuration x (x=0 to 6) is to be used, then the mapping can be accessed to determine the dynamic UL/DL configuration to which the UE can be transitioned. Note that Table 4 is an example, and other tables that define the permitted dynamic UL/DL configurations are possible.

Unified DRX Configuration Setting Technique

In alternative implementations, a unified DRX configuration can be set at a UE, to ensure that DRX operation at the UE does not lead to various issues above as a result of a dynamic UL/DL configuration change. The unified DRX configuration includes a set of DRX parameter values that can be consistently used with any of various dynamic UL/DL configurations. Either an advanced UE or a legacy UE can be configured with the unified DRX configuration.

As depicted in FIG. 1, the largest number of consecutive uplink subframes in any of the seven UL/DL configurations (0-6) is three. As a result, the unified DRX configuration can specify that the onDurationTimer has at least a value 4 (to count four subframes), the drx-InactivityTimer has at least a value 4, and the drx-RetransmissionTimer has at least a value 4. This would ensure that, after a dynamic UL/DL configuration change to any of the seven UL/DL configurations, a UE will have at least one downlink or special subframe before the respective timer (e.g. onDurationTimer, drx-InactivityTimer, or drx-RetransmissionTimer) expires.

As another example, if a dynamic UL/DL configuration change can be constrained to UL/DL configurations having the same switching point periodicity (e.g. UL/DL configurations 3, 4, and 5, which have a switching point periodicity of 10 ms), the unified DRX configuration can specify that the foregoing timers each has at least a value of 3 subframes. This is because the possible largest number of consecutive uplink subframe difference before and after a dynamic UL/DL configuration change is two, if dynamic UL/DL configuration changes are constrained to UL/DL configurations 3, 4, and 5.

In further implementations, in the unified DRX configuration, the ShortDRX-Cycle parameter may be set to a relatively small value, such as 20 ms, to reduce or minimize scheduling latency when data traffic is available for communication. In the unified DRX configuration, the drxStartOffset parameter may be set such a way that a subframe in which the onDurationTimer is started is more likely to be a downlink subframe or special subframe, and subsequent subframes are also more likely to be downlink or special subframes. For example, if a DRX cycle is set to 20 ms, the drxStartOffset parameter may be set to have any of the following values: 0, 4, 5, 6, 8, 9, 14, 15, 16, 18, or 19.

In alternative implementations, in the unified DRX configuration, the DRX parameter may be set to align with the pattern of fixed DL subframes only (i.e. subframes 0, 1, 5, 6 in FIG. 1), or to align with subframe patterns which may contain (E)PDCCH or CSI reference symbols.

Uplink Resource Configurations for Dynamic UL/DL Configuration Changes

If a UE is unaware of a dynamic UL/DL configuration change, then the UE may attempt to transmit uplink information in a subframe (an "ineligible subframe") that cannot be used to send uplink information in the current dynamic UL/DL configuration. For example, the UE may attempt to transmit uplink information in a downlink subframe in the current dynamic UL/DL configuration.

A legacy UE does not understand signaling to perform a dynamic UL/DL configuration change. Also, an advanced UE may not be notified of a dynamic UL/DL configuration change if the advanced UE is not actively communicating data, or a traffic pattern of the UE can be served by the semi-static UL/DL configuration.

Examples of uplink information that may be sent in an ineligible subframe of a current dynamic UL/DL configuration may include one or more of the following: a Physical Random Access Channel (PRACH) preamble, a channel state information (CSI) report, a Sounding Reference Signal (SRS), or any other uplink information.

In accordance with some implementations, a mechanism is provided to restrict usage of selected resources, to avoid a UE sending uplink information in an ineligible subframe of a current dynamic UL/DL configuration.

For example, to avoid transmitting a PRACH preamble in a downlink subframe of a current dynamic UL/DL configuration, only selected PRACH resource indexes should be used in a cell where dynamic UL/DL configuration is employed. A PRACH preamble is sent by a UE as part of a random access procedure for the purpose of establishing a connection with a wireless access network node.

The transmission of a PRACH preamble is restricted to specific time and frequency resources in a radio frame. Resources in a radio frame that can be used for transmitting a PRACH preamble can be specified in a PRACH resource index. Various example PRACH resource indexes are provided in Tables 5.7.1-2 and 5.7.1-4 of 3GPP TS 36.211.

Table 5.7.1-4 of 3GPP TS 36.211 specifies physical resources for the different random access opportunities used for a particular PRACH density value, $D_{RA}$. Each entry of the table includes a quadruple (including four parameters) of the format ($f_{RA}, t_{RA}^{(0)}, t_{RA}^{(1)}, t_{RA}^{(2)}$), where the quadruple indicates the location of a specific random access resource to use for a respective UL/DL configuration. Each PRACH resource index in the table specifies a set of quadruples for respective UL/DL configurations 0-6.

In each quadruple, the parameter $f_{RA}$ is a frequency resource index within a time instance, the parameter $t_{RA}^{(0)}=0,1,2$ indicates whether the resource is reoccurring in all radio frames, in even radio frames, or in odd radio frames, respectively, the resource $t_{RA}^{(1)}=0,1$ indicates whether the random access resource is located in a first half frame or in a second half frame, respectively, and the parameter $t_{RA}^{(2)}$ is the uplink subframe number where the preamble starts, counting from zero at the first uplink subframe between two consecutive downlink-to-uplink switching points. For PRACH preamble format 4, the parameter $t_{RA}^{(2)}$ is denoted as (*) in the quadruple.

The frame structure of the radio frame used for TDD mode is referred to as frame structure type 2, according to the 3GPP standards. For frame structure type 2, there can be several different PRACH preamble formats (e.g. formats 0-4). If preamble format 4 is used, then transmission of the PRACH preamble is restricted to an uplink pilot time slot (UpPTS) of a special subframe.

For each of PRACH configuration indexes 48, 49 and 51 in Table 5.7.1-4 of 3GPP TS 36.211, the same quadruple is specified for each of the UL/DL configurations 0-6. As a result, if any of PRACH configuration indexes 48, 49 and 51 is used for specifying resources to use for PRACH preamble transmissions, then dynamic UL/DL reconfiguration can allow a change to any of the UL/DL configurations 0-6.

For the other indexes, 50 and 52 contain N/A. Therefore full range of UL/DL configuration change is not allowed with the index 50 and 52 in order to prevent UE from transmitting PRACH preambles in invalid subframes. Concerning the index from 53 to 57, some UL/DL configurations have different quadruples from other configurations. Therefore again full range of UL/DL configuration change is not allowed.

If other PRACH resource indexes are used to define resources for PRACH preamble transmissions, then the UL/DL configurations that can be used for dynamic UL/DL reconfigurations can be restricted. For example, if a wireless access network configures the use of any of PRACH resource indexes 48 to 57, then the UL/DL configurations that can be used for dynamic UL/DL reconfiguration can be restricted to UL/DL configurations that have the same switching point periodicity (as depicted in FIG. 1), since the quadruples of any of PRACH resource indexes 48 to 57 for the UL/DL configurations having the same switching point periodicity are identical.

By specifying selected PRACH resource indexes to use, and optionally configuring UL/DL reconfiguration to a constrained subset of UL/DL configurations, a mechanism is provided to ensure that a UE that is unaware of a dynamic UL/DL configuration change does not transmit PRACH preambles in ineligible subframes.

In alternative implementations, an advanced UE may be configured to only use quadruples that are common among multiple different UL/DL configurations. For example for PRACH preamble index 54, the UE may only transmit PRACH preambles in resources specified by quadruples (0,0,0,*) and (1,0,0,*), because these quadruples are common in all the UL/DL configurations.

As noted above, another type of uplink information that may be sent in an ineligible subframe of a current dynamic UL/DL configuration is a CSI report. A UE may send periodic CSI reports to a wireless access network node. If an advanced UE is made aware of a dynamic UL/DL configuration change, then the advanced UE can stop transmitting a periodic CSI report if the scheduled subframe is a downlink subframe in the current dynamic UL/DL configuration.

However, a legacy UE or an advanced UE not notified of a dynamic UL/DL configuration change may be unaware of the current dynamic UL/DL configuration, and thus may transmit CSI reports in downlink subframes.

To avoid the transmission of a CSI report over a downlink subframe of a current dynamic UL/DL configuration, an offset that is specified for periodic CSI reporting can be set such that the transmission of a CSI report always occurs in subframe 2 (which is an uplink subframe in all UL/DL configurations).

A CSI report may include a channel quality indication (CQI) or a precoding matrix indicator (PMI). The CQI provides an indication of the quality of a downlink channel. The PMI indicates a precoding to be applied to data. For reporting the CQI and/or PMI, an index cqi-pmi-ConfigIn-dex can be configured to 18 or 28 if the periodicity is 20 ms, to ensure that the CQI and/or PMI is sent in subframe 2.

A wireless access network node may also restrict the UL/DL configurations that can be used for dynamic UL/DL reconfiguration. For example, if the UL/DL configurations for dynamic UL/DL reconfiguration are restricted to UL/DL configurations 0, 1, 2, and 6, then CSI reporting can be scheduled in both subframes 2 and 7.

As noted above, another type of uplink information that can be sent by a UE in an ineligible subframe as a result of an UL/DL configuration change is a Sounding Reference Signal (SRS), for measurement by a wireless access network to determine channel quality and for other purposes.

As specified in Table 8.2-2 of 3GPP TS 36.213, for example, various SRS configuration indexes can be used for controlling transmissions of SRS in certain resources. In accordance with some implementations, selected SRS configuration indexes can be used to ensure that SRS transmission occurs in one or both of: (1) the uplink pilot time slot (UpPTS) of a special subframe in the first half of a radio frame, or (2) subframe 2.

In this way, it can be ensured that an SRS transmission will occur in the UpPTS of a special subframe or an uplink subframe, regardless of which dynamic UL/DL configuration is used. If the UL/DL configurations used for a dynamic UL/DL reconfiguration is restricted, then more transmission opportunities may be made available for SRS transmissions by the UE.

Figure 9:
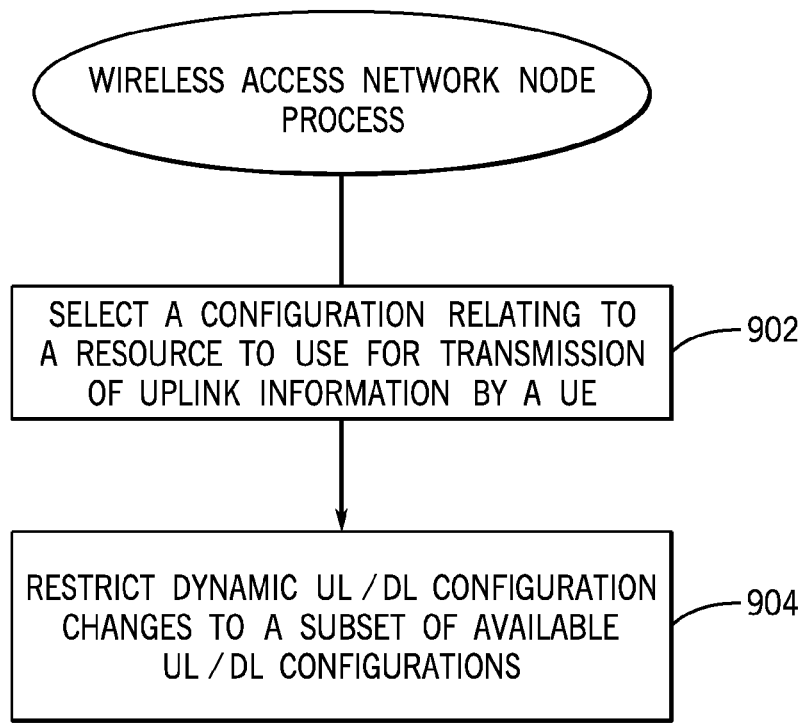
FIG. 9 is a flow diagram of a process performed by a wireless access network node, according to alternative implementations.

FIG. 9 is a flow diagram of a process performed by a wireless access network node according to some implementations. The wireless access network node selects (at 902) a configuration relating to a resource to use for transmission of uplink information by a UE, to prevent the transmission of uplink information (e.g. PRACH preamble, CSI report, or SRS) in an ineligible subframe. As examples, the selected configuration can be a PRACH resource index, an offset relating to CSI reporting, or an SRS configuration index, as examples.

The wireless access network node may also restrict (at 904) dynamic UL/DL configuration changes to a subset (less than all) of available UL/DL configurations (0-6).

In general, according to some aspects, a wireless access network node selects a configuration relating to a resource to use for transmission of uplink information by a UE, to prevent the transmission of uplink information in an ineligible subframe due to a dynamic uplink-downlink configuration change.

In general, according to further aspects, the selected configuration is a configuration relating to a resource to use for transmission of random access information.

In general, according to further aspects, the random access information includes a random access preamble.

In general, according to further aspects, the selected configuration is a configuration relating to a resource to use for transmission of channel state information.

In general, according to further aspects, the selected configuration is a configuration relating to a resource to use for transmission of a sounding reference signal.

In general, according to further aspects, the wireless access network node restricts dynamic UL/DL configuration changes to a subset of available UL/DL configurations.

System Architecture

Figure 10:
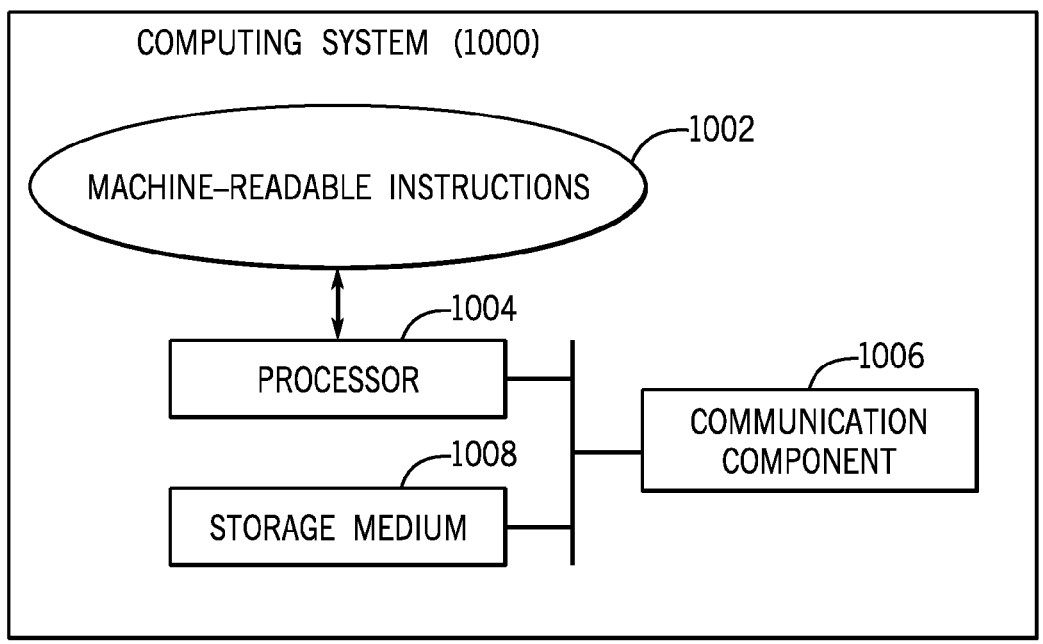
FIG. 10 is a block diagram of an example computing system according to some examples.

FIG. 10 depicts a computing system 1000, which can be a UE or a wireless access network node, as discussed above. The computing system 1000 includes machine-readable instructions 1002, which are executable on a processor (or multiple processors) 1004 to perform various tasks discussed above. A processor can include a microprocessor, microcontroller, processor module or subsystem, programmable integrated circuit, programmable gate array, or another control or computing device.

The processor(s) 1004 can be coupled to a communication component 1006 to perform communications. For example, the communication interface 1006 can perform wireless communication over an air interface, or perform wired communication over a wired connection. In some cases, the computing system 1000 can include multiple communication components 1006 to communicate with respective different network nodes.

The processor(s) 1004 can also be coupled to a computer-readable or machine-readable storage medium (or storage media) 1008, for storing data and instructions. The storage medium or storage media 1008 can be implemented as one or multiple computer-readable or machine-readable storage media.

The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
  providing a configuration of a discontinuous reception (DRX) operation at a user equipment (UE) to handle dynamic uplink-downlink configuration changes, wherein providing the configuration of the DRX operation comprises providing a data structure including a mapping between combinations of uplink-downlink configurations and respective plural sets of DRX parameters, wherein each set of DRX parameters of the plural sets of DRX parameters includes a value of an onDurationTimer parameter and a value of a drx-InactivityTimer parameter, wherein a first set of the plural sets of DRX parameters contains values of the onDurationTimer parameter and the drx-Inactivity-Timer parameter that differ from values of the onDurationTimer parameter and the drx-InactivityTimer parameter in a second set of the plural sets of DRX parameters, the first set mapped by the data structure to a first combination of the combinations, and the second set mapped by the data structure to a second combination of the combinations; and
  in response to receiving an indication of a given dynamic uplink-downlink configuration change, selecting, by the UE, a set of DRX parameters corresponding to the given dynamic uplink-downlink configuration change from the plural sets of DRX parameters in the data structure.

2. The method of claim 1, wherein each combination of the combinations of uplink-downlink configurations include a current dynamic uplink-downlink configuration and one of a previous dynamic uplink-downlink configuration and a configured uplink-downlink configuration indicated by system information.

3. The method of claim 1, further comprising:
  varying a DRX operation at the UE in response to the dynamic uplink-downlink configuration changes, wherein the varying of the DRX operation at the UE is responsive to changing between using one set of DRX parameters and using another set of DRX parameters in response to a change from a first uplink-downlink configuration to a second uplink-downlink configuration.

4. The method of claim 1, further comprising receiving, by the UE from a wireless access network node, the data structure.

5. The method of claim 1, wherein providing the configuration of the DRX operation comprises providing the configuration that triggers provision of a subsequent retransmission window at the UE in response to the UE not receiving a retransmission in a previous retransmission window.

6. The method of claim 1, wherein providing the configuration of the DRX operation comprises temporarily halting the DRX operation in response to detecting a change from an uplink-downlink configuration indicated by system information to a dynamic uplink-downlink configuration.

7. The method of claim 1, wherein each set of DRX parameters of the plural sets of DRX parameters further includes at least one further value selected from among: a value of a hybrid automatic repeat request (HARD) round trip time (RTT) timer parameter, a value of a drx-RetransmissionTimer parameter, a value of a shortDRX-Cycle parameter, and a value of a drxShortCycleTimer parameter.

8. A user equipment (UE) comprising:
  a communication interface to communicate with a wireless access network node;
  a storage medium to store a data structure including a mapping between combinations of uplink-downlink configurations and respective plural sets of DRX parameters, wherein each set of DRX parameters of the plural sets of DRX parameters includes a value of an onDurationTimer parameter and a value of a drx-InactivityTimer parameter, wherein a first set of the plural sets of DRX parameters contains values of the onDurationTimer parameter and the drx-InactivityTimer parameter that differ from values of the onDurationTimer parameter and the drx-InactivityTimer parameter in a second set of the plural sets of DRX parameters, the first set mapped by the data structure to a first combination of the combinations, and the second set mapped by the data structure to a second combination of the combinations, the data structure providing a configuration of a DRX operation at the UE to handle dynamic uplink-downlink configuration changes; and at least one processor configured to:
  in response to receiving an indication of a given dynamic uplink-downlink configuration change, select a set of DRX parameters corresponding to the given dynamic uplink-downlink configuration change from the plural sets of DRX parameters in the data structure.

9. The UE of claim 8, wherein each set of DRX parameters of the plural sets of DRX parameters further includes at least one further value selected from among a value of a hybrid automatic repeat request (HARQ) round trip time (RTT) timer parameter, a value of a drx-Retransmission-Timer parameter, a value of a shortDRX-Cycle parameter, and a value of a drxShortCycleTimer parameter.

10. The UE of claim 8, wherein each combination of the combinations of uplink-downlink configurations include a current dynamic uplink-downlink configuration and one of a previous dynamic uplink-downlink configuration and a configured uplink-downlink configuration indicated by system information.

11. The UE of claim 8, wherein the at least one processor is configured to further vary a DRX operation at the UE in response to the dynamic uplink-downlink configuration changes, wherein the varying of the DRX operation at the UE is responsive to changing between using one set of DRX parameters and using another set of DRX parameters in response to a change from a first uplink-downlink configuration to a second uplink-downlink configuration.

12. The UE of claim 8, wherein the at least one processor is configured to receive the data structure from the wireless access network node.

* * * * *